(12) United States Patent
Daschner et al.

(10) Patent No.: US 6,466,371 B1
(45) Date of Patent: Oct. 15, 2002

(54) DIFFRACTIVE LENS WITH GRATINGS MODIFIED TO OFFSET EFFECTS CAUSED BY HOLDING THE LENS AT AN ANGLE WITH RESPECT TO A LIGHT SOURCE

(75) Inventors: Walter Daschner, Half Moon Bay, CA (US); Bernard Kress, Neubourg (FR)

(73) Assignee: Aerial Imaging Corporation, Milpitas, CA (US)

( * ) Notice: Subject to any disclaimer, the term of this patent is extended or adjusted under 35 U.S.C. 154(b) by 0 days.

(21) Appl. No.: 09/491,714

(22) Filed: Jan. 27, 2000

Related U.S. Application Data

(63) Continuation of application No. 09/491,351, filed on Jan. 26, 2000, now abandoned.

(51) Int. Cl.[7] ............................................. G02B 27/44
(52) U.S. Cl. ..................... 359/565; 359/569; 359/575; 359/900
(58) Field of Search ..................... 359/16, 19, 565, 359/569, 575, 900, 566

(56) References Cited

U.S. PATENT DOCUMENTS

| | | | |
|---|---|---|---|
| 3,586,412 A | 6/1971 | Leith | |
| 4,218,111 A | * 8/1980 | Withrington et al. | 345/7 |
| 5,122,903 A | 6/1992 | Aoyama et al. | 359/565 |
| 5,138,495 A | * 8/1992 | Shiono et al. | 369/44.23 |
| 5,257,132 A | * 10/1993 | Ceglio et al. | 359/565 |
| 5,315,095 A | 5/1994 | Marom et al. | 235/462 |
| 5,446,565 A | 8/1995 | Komma et al. | 359/19 |
| 5,561,558 A | 10/1996 | Shiono et al. | 359/569 |
| 5,966,244 A | * 10/1999 | Mukai et al. | 359/565 |
| 5,986,779 A | * 11/1999 | Tanaka et al. | 359/570 |

FOREIGN PATENT DOCUMENTS

| | | |
|---|---|---|
| JP | 59-105605 | 6/1984 |

OTHER PUBLICATIONS

Sinzinger et al., "Microoptics", published by Wiley–VCH, 1999, pp. 167–173.

* cited by examiner

*Primary Examiner*—Cassandra Spyrou
*Assistant Examiner*—John Juba, Jr.

(57) ABSTRACT

A diffractive lens constructed in accordance with the invention comprises a set of bands such that the diffractive gratings in each band are modified. This is done to ensure that even if the lens is tilted (e.g. to prevent light from reflecting off the lens and, introducing distortion into an optical system), the lens continues to focus light onto a small point on a target surface. (The target surface is typically an optical or magneto-optic data recording medium.)

43 Claims, 3 Drawing Sheets

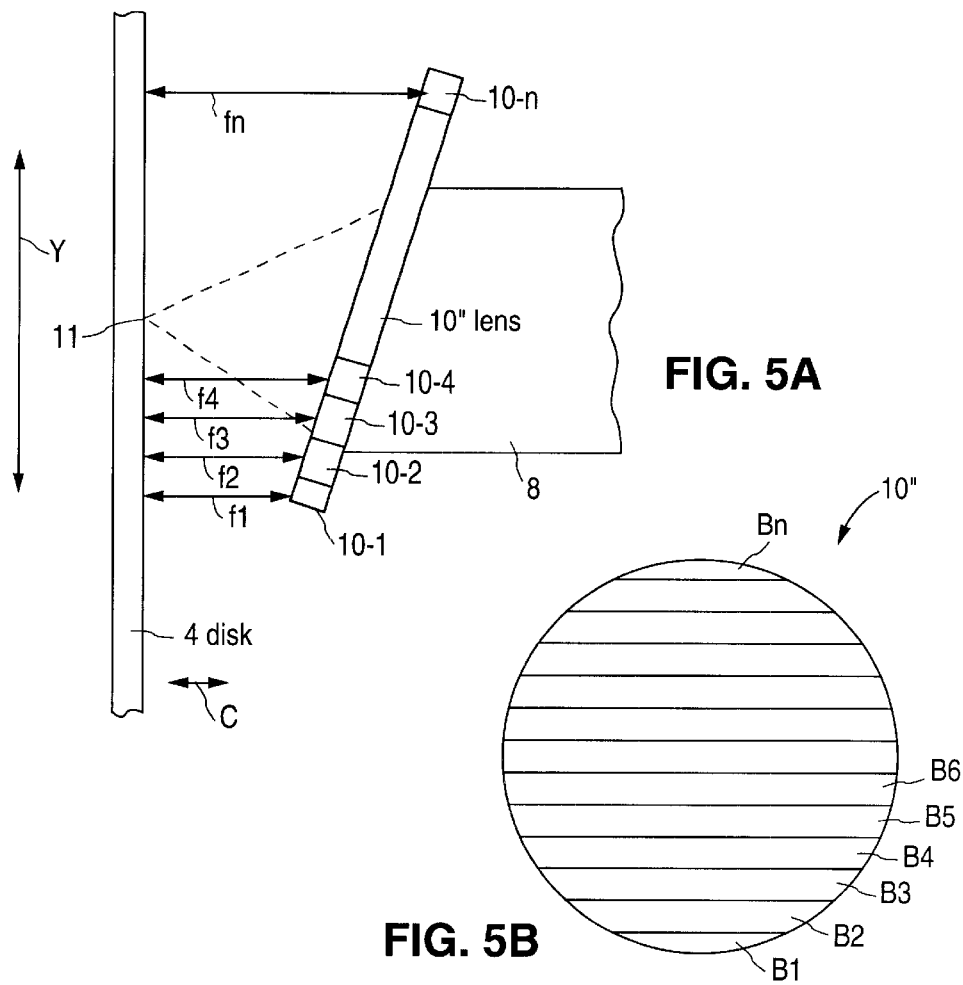
FIG. 5A
FIG. 5B
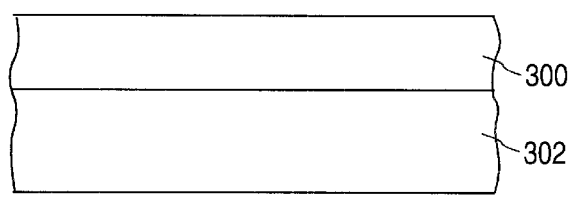
FIG. 6A
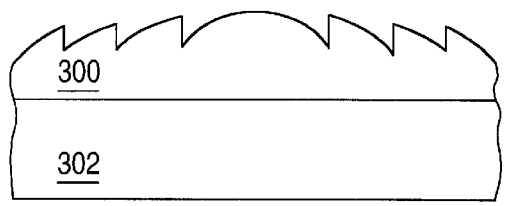
FIG. 6B
FIG. 6C

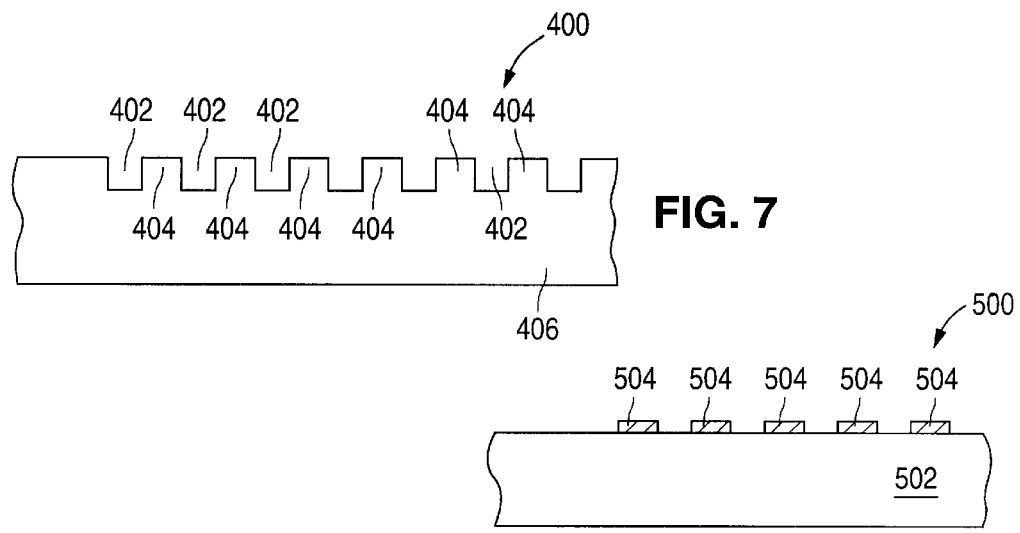
FIG. 7
FIG. 8
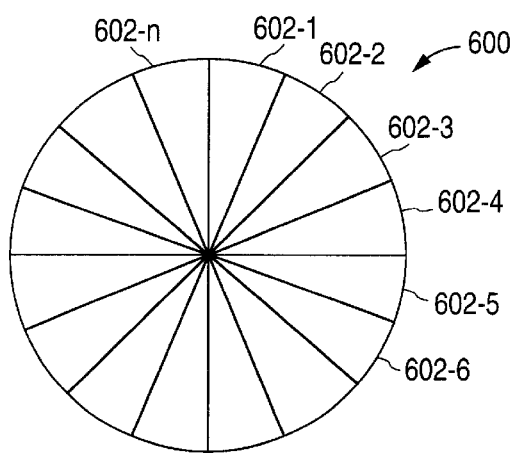
FIG. 9
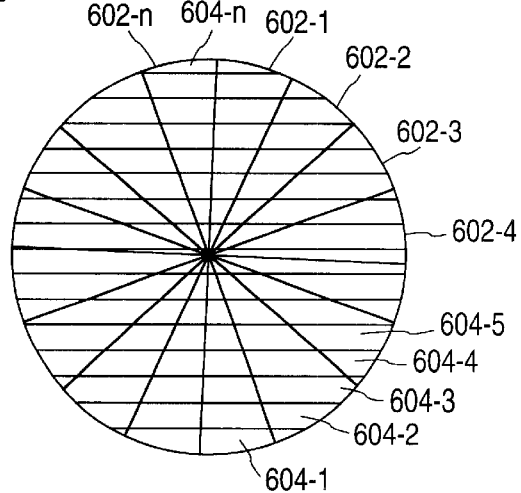
FIG. 10

DIFFRACTIVE LENS WITH GRATINGS MODIFIED TO OFFSET EFFECTS CAUSED BY HOLDING THE LENS AT AN ANGLE WITH RESPECT TO A LIGHT SOURCE

This patent is a continuation of our U.S. patent application Ser. No. 09/491,351, filed Jan. 26, 2000, now abandoned.

BACKGROUND OF THE INVENTION

This invention relates to lenses. In particular, this invention relates to diffractive lenses. This invention also relates to lenses used in conjunction with magnetic, magneto-optic or phase change optical recording media. This invention also relates to methods for making lenses.

FIG. 1 illustrates a portion of a magneto-optic disk drive 2 comprising a magneto-optic recording disk 4 and a laser source 6 (typically a diode laser). During use, laser source 6 provides a laser beam 8 that pass through a beam splitter 9. Laser beam 8 then passes through and is focused by a diffractive lens 10 into a spot 11 on disk 4. Beam 8 is then reflected back through lens 10 to beam splitter 9. Beam 8 is then reflected by beam splitter 9 through a lens 12 which focuses beam 8 onto a sensor 14.

Unfortunately, during reading operations, a portion of laser beam 8 can reflect off of lens 10. This portion of laser beam 8 is then reflected by beam splitter 9 through lens 12 to sensor 14, where it introduces noise into the signal detected by sensor 14. We have experimented with tilting lens 10 as shown in FIG. 2, so that light reflecting off lens 10 does not interfere with the operation of sensor 12. However, we have found that if diffractive lens 10 is tilted, it is highly desirable to modify lens 10 so that it continues to form an aberration-free or substantially aberration-free focused spot on disk 4.

FIG. 3 schematically illustrates lens 10 in plan view. Lens 10 is arbitrarily drawn as a circle. Also shown in FIG. 3 are X and Y axes to facilitate a discussion of lens 10. Lenses such as lens 10 are commonly described using an equation as set forth below:

$$P(x, y) = \sum_{i=1}^{n} \alpha_i (x^2 + y^2)^i \quad (1)$$

where P is the phase profile (in radians) of the lens at a particular point x, y of the lens surface. In other words, light striking a point x, y of lens 10 has its phase modified by a number of radians equal to $\mod[2\pi]P(x,y)$ where $\mod[2\pi]$ is the modulus operator. In equation 1, the variable $\alpha_i$ is called the aspheric coefficient.

If lens 10 were a refractive lens, function P(x, y) would be proportional to the height profile of the lens. In other words, $$H(x,y) = P(x,y)/\lambda \quad (2)$$

where H(x,y) is the height of the lens (in the z direction) at point x,y and $\lambda$ is the wavelength of light within the lens material. (See FIG. 3A, which illustrates a plano-convex refractive lens in cross section along lines A—A.)

As mentioned above, lens 10 is a diffractive lens. One type of diffractive lens is a blazed zone plate lens. FIG. 4 illustrates in cross section a blazed zone plate lens 10'. Blazed zone plate lenses can be used to focus light at a focal point, but as can be seen, they have a cross section that is somewhat different from a piano-convex refractive lens. In particular, lens 10' comprises a set of concentric ridges and valleys. Blazed zone plate lenses are discussed in "Microoptics", by Sinzinger et al., published by Wiley-VCH Verlag GmbH in 1999, incorporated herein by reference.

Referring back to FIG. 1, for the case in which lens 10 is not tilted, lens 10 is designed such that $\alpha_i$ is not a function of x or y alone. Rather, (X is a function only $x^2+y^2$ (i.e. a function of the radial distance to the center of the lens). However, as mentioned above, if lens 10 is tilted about the x axis to prevent the above-mentioned reflection problem, lens 10 must be modified or it will no longer be able to narrowly focus laser light at spot 11. It would be desirable to modify lens 10 so that it can be tilted and still be able to narrowly focus light on spot 11 within the data recording disk.

SUMMARY

A diffractive lens constructed in accordance with the invention comprises diffraction gratings. The spacing of the gratings varies over the lens surface so that the lens can focus light onto a small spot on a data recording medium even though the lens is tilted with respect to the laser beam. In one embodiments the lens is a blazed zone plate lens. In another embodiment, the lens is a phase zone plate lens. In another embodiment, the lens comprises alternating opaque and transparent regions. Because the spacing of the gratings is varied, any aberration in the focused spot of light provided by the lens reduced compared to what would be produced without varying the grating spacing. In one embodiment, the amount of aberration is substantially eliminated or completely eliminated.

In one embodiment, rather than having circular diffraction gratings, the gratings are somewhat oval shaped in order to reduce aberrations. For example, the gratings can have the shape of the intersection of a hollow cone and a slanted plane passing through the cone. However, as explained below, the gratings can have other shapes as well.

BRIEF DESCRIPTION OF THE DRAWINGS

FIG. 5A illustrates in cross section a tilted lens in accordance with the present invention for focusing light on a data recording medium.

FIG. 5B schematically illustrates a lens in accordance with the present invention in plan view.

FIGS. 6A to 6C illustrates in cross section a blazed zone plate lens during manufacturing.

FIG. 7 illustrates in cross section a phase zone plate lens in accordance with the present invention.

FIG. 8 illustrates ross section a binary zone plate lens in accordance with the present invention.

FIG. 9 schematically illustrates in plan view a lens comprising regions having different focal length characteristics to increase the lens depth of focus.

FIG. 10 schematically illustrates in plan view a modified version of the lens of FIG. 9 which a) includes different regions having different focal lengths so that the lens as a whole exhibits enhanced depth of focus; and b) is further modified such that different bands across the lens surface exhibit modified focal characteristics so that the lens continues to form a sharp focal point even if the lens is tilted.

DETAILED DESCRIPTION

Figure 1:
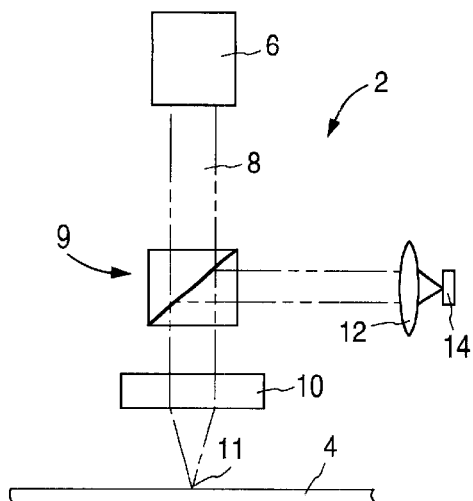
FIG. 1 illustrates a lens focusing light from a diode laser onto a spot within a data recording ask.
Figure 2:
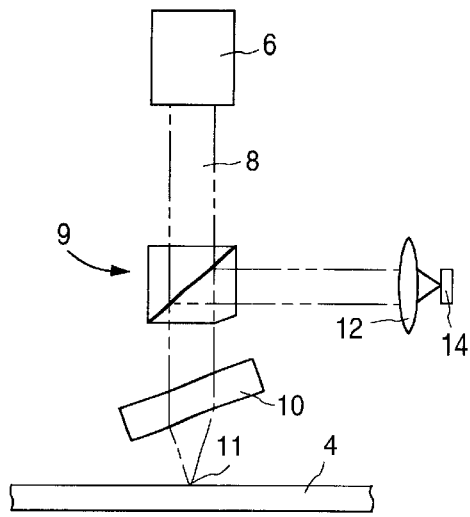
FIG. 2 illustrates a lens being tilted so that light reflecting off the lens does not interfere with a sensor sensing the laser light from the data recording disk.
Figure 3:
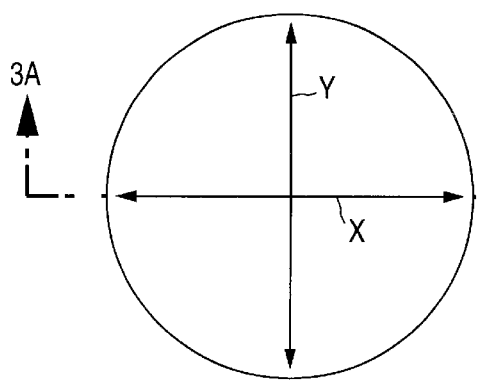
FIG. 3 schematically illustrates a lens in plan view.
Figure 3A:
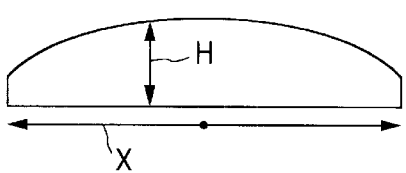
FIG. 3A illustrates in cross section a refractive plano-convex lens.

A lens constructed in accordance with a first embodiment of our invention is a diffractive lens such as a blazed zone plate lens. As explained below, the spacing of the lens gratings is varied in the Y direction so that the lens can be tilted along the X axis and still be able to focus laser light onto a small spot on a magneto-optic or optical data recording disk. As mentioned above, the lens can be described using equation (1). In other words, the lens can be described in terms of aspheric coefficients $\alpha_i$. In a first embodiment of the invention, coefficients as are modified to be a function of y. Appropriately modifying $\alpha_i$, the diffractive lens will be able to focus light on spot 11 without distortion when the lens is tilted along the X axis. (In FIGS. 2 and 5A, the X axis extends out of the plane of the drawing.)

FIG. 5A illustrates a lens 10" constructed in accordance with the invention. Both major surfaces of lens 10" are typically exposed to the ambient atmosphere. Lens 10" is tilted along the X axis to avoid the above-mentioned problem concerning light reflecting off the lens and introducing noise into a sensor. In accordance with one feature of the present invention, lens 10" is modified so that even though it is tilted with respect to laser beam 8, it can still focus laser beam 8 onto a small spot 11 on disk 4. In one embodiment, lens 10" is tilted such that its optical axis is at an angle between 0.5 and 5° with respect to laser beam 8, e.g. an angle of 1°. However, other angles can be used, e.g. an angle of 45°.

Laser beam 8 can have any appropriate wavelength. In one embodiment, laser beam 8 has a wavelength of 650 nm. In another embodiment, laser beam 8 has a wavelength of 780 nm. The laser power can be between 5 and 200 mW, and can be a diode laser. However, other types of laser beams and laser sources can also be used.

Referring to FIG. 5A, a first portion 10-1 of tilted lens 10" is a distance f1 from disk 4, a second portion 10-2 is a distance f2 from disk 10, a third portion 10-3 of lens 10 is a distance f3 from disk 4, and so on.

During a method in accordance with the invention, we calculate a first set of aspheric coefficients $\alpha_i$ assuming a focal distance f1. Those coefficients are used to determine the position of the diffractive pattern in a band B1 of lens 10" (FIG. 5B). We then calculate a second set of aspheric coefficients $\alpha_i$ assuming a focal distance f2. Those coefficients are used to determine the position of the diffractive pattern in a band B2 of lens 10". The process is repeated for each band B1 to Bn of lens 10". Thus, each band of the lens has a slightly different focal characteristic. However, because of the manner in which the diffractive pattern is modified, even though lens 10" is tilted, it is still able to tightly focus laser light onto a small spot 11 on disk 4.

The process of determining the coefficients $\alpha_i$, as well as the process of determining the position of the diffraction gratings given a set of aspheric coefficients $\alpha_i$, is known in the art, and can be accomplished, for example, using a commercially available computer program such as Code V, available from Optical Research Associates of Pasadena, Calif.

In a second embodiment of the invention, instead of forming bands B1 to Bn such that they have discrete characteristics, the lens is formed such that the characteristics of the lens (and the lens gratings) vary continuously over the lens surface. One way of doing this is to calculate a function for each variable as that varies continuously in the y direction. In other words, we generate variables $\alpha_i(y)$ that vary continuously, based on a curve fitting algorithm. The curve fitting algorithm can be a commercially available algorithm, e.g. as provided in spread sheet programs such as Microsoft Excel.

In another embodiment, lens 10" is tilted about its x and y axes. If this is done, variables $\alpha_i$ become a function of both x and y.

Method for Making a Lens In Accordance with the Invention

Figure 4:
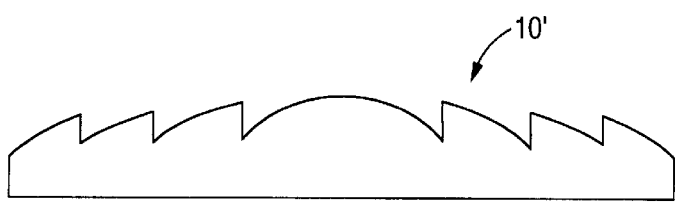
FIG. 4 illustrates in cross section a blazed zone plate lens.

One embodiment of a lens in accordance with the invention is a blazed zone plate. (As mentioned above, FIG. 4 illustrates a blazed zone plate lens in cross section.) One method of making a lens in accordance with the invention comprises the following steps:

1. A resist layer 300 is deposited on a transparent substrate 302 (FIG. 6A). Substrate 302 is typically a transparent material such as glass. Resist layer 300 can be an organic or inorganic resist layer.
2. Resist layer 300 is patterned, e.g. using an e-beam patterning technique (FIG. 6B). The input data file for the e-beam writer is generated using the phase profile information described above as an input into an e-beam data generator or algorithm. Merely by way of example, in one embodiment, the e-beam data generator can be DOE-CAD available from Diffractive Solutions of Strasbourg, France.
3. The pattern in layer 300 is transferred to substrate 302 using an etching technique. During this step of transferring the pattern, resist layer 300 is etched away from substrate 302.

Details concerning a method for forming a blazed zone plate can be found in U.S. Pat. No. 5,998,066, issued to Block et al. and PCT Application WO 98/52101, filed by Aerial Imaging Corporation. The '066 Patent and WO 98/52101 Application are incorporated herein by reference.

Another type of diffractive grating lens that can be used to practice the invention is a phase zone plate lens 400, e.g. as shown in FIG. 7. This lens comprises alternating recessed regions 402 and non-recessed regions 404 formed in a transparent substrate 406 (typically glass). These alternating recessed regions 402 and non-recessed regions 404 function as a diffractive lens for focusing light from a laser beam onto a data recording medium. A method for manufacturing phase zone plate lenses is described in European Patent Application EP 0 871 163 A2, filed by Aerial Imaging Corporation and U.S. patent application Ser. No. 09/059,778, filed by Block et al. on Apr. 13, 1998. These applications are incorporated herein by reference. Of importance, the position of the gratings in the present invention is modified such that even though the lens is tilted along its X axis, the lens still focuses laser beam 8 onto a small spot 11 on disk 4 for reasons described above.

Another type of diffractive grating lens comprises alternating opaque and transparent regions. An example of such a lens is lens 500, shown in FIG. 8. Lens 500 comprises a transparent substrate 502 (e.g. glass) and a patterned opaque layer 504 (e.g. chromium that is deposited on substrate 502 by sputtering and then lithographically patterned). Opaque layer 504 is patterned into concentric bands that serve as a diffractive lens for focusing light onto a small spot on disk 4. Methods for making such lenses are described in the above-incorporated EP 0 871 163 A2 and Ser. No. 09/059,778 Applications. Again, the position of these bands is modified in the present invention to permit the lens to focus light onto a small spot on disk 4 when the lens is tilted along the X axis as described above.

Embodiment of a Lens Adapted for Motion of a Recording Medium in the Z Direction Referring to FIG. 5A, optical or magneto-optic recording medium 4 is typically a disk that spins during use. Unfortunately, disk 4 is prone to wobbling, e.g. as shown by arrow C in FIG. 5A. If lens 10" has a narrow depth of focus, disk 4 may move out of focus, and lens. 10" will no longer be capable of focusing light on small spot 11 on disk 4. Accordingly, in one embodiment, lens 10" is further adjusted to include regions having different depths of focus. FIG. 9 schematically shows a lens 600 in plan view in accordance with this embodiment. Referring to FIG. 9, lens 600 is divided into regions 602-1 to 602-n. Each region is adjusted to have a slightly different focal length. Thus, for example, region 602-1 exhibits a first focal length f1', region 602-2 exhibits a second focal length f2', region 603-3 exhibits a third focal length f3', and so on. Thus, if disk 4 wobbles and moves slightly in the direction of arrow B (FIG. 5A), different portions of lens 600 will continue to ensure that laser light is focused onto a small spot on recording medium 4.

If that were the only modification made to lens 600, it would exhibit an enhanced depth of focus. (Such a lens is described in detail in U.S. patent application 09/288,269, filed by Daschner et al. on Apr. 8, 1999, incorporated herein by reference. Referring to FIG. 10, lens 600 is further modified to account for a tilt in the lens. In particular, lens 600 further comprises bands 604-1 through 604-n. The focal lengths of bands 604 are modified to further account for the tilt of lens 600 along the X axis. Accordingly, lens 600 provides both the advantage of a) providing extended depth of focus; and b) providing a sharp focal point even though lens 600 is tilted.

In FIG. 10, lens regions 602 are "pie slice" shaped. However, regions 602 can have other shapes as well, e.g. as disclosed in the '269 Application. Further, there need not be a discrete step between the different regions 602. For example, the grating spacing can gradually change near the border of regions 602-1 and 602-2 and near the other borders as well.

While the invention has been described with respect to specific embodiments, those skilled in the art will appreciate that changes can be made in form and detail without departing from the spirit and scope of the invention. Accordingly, all such changes come within the present invention.

We claim:

1. A method comprising the acts of:
   establishing a plurality of sets of aspheric coefficients, each set describing a phase profile; and
   using said sets of aspheric coefficients to establish the spacing for a set of diffractive gratings that serve as a lens for focusing light from a light source, said aspheric coefficients being selected to vary the spacing of said diffractive gratings to accommodate a tilt of said lens with respect to said light.

2. Method of claim 1 wherein said gratings both focus light and collimate light.

3. Method of claim 1 wherein said gratings are formed on one surface of a body of material.

4. Method of claim 3 wherein said gratings cause said light to converge, the variation of the spacing of said gratings reducing or eliminating coma aberration.

5. Method of claim 1 wherein said set of aspheric coefficients is used to generate a pattern that is lithographically applied to said lens.

6. Method of claim 1 wherein said sets of aspheric coefficients are selected to cause the focal length of portions of said lens to generally increase as a function of the position on the surface of said lens as one moves from one side of the lens across a major surface of said lens to the other side of said lens so that said lens can be tilted with respect to a light source and exhibit reduced or no coma aberration.

7. Method of claim 1 further comprising establishing a set of functions, each function generating one of said aspheric coefficients, said functions being dependent upon the position on a major surface of, said lens, said act of using comprising using said functions to establish the spacing of said gratings on said lens.

8. Method of claim 1 wherein the spacing of said gratings is also varied so that if said lens is positioned closer to or further from a target, said lens can continue to focus light onto said target.

9. Method of claim 1 wherein said lens exhibits substantially no spherical aberration.

10. Method of claim 1 wherein said light passes through said gratings and said gratings focus said light.

11. Method of claim 1 wherein said gratings are approximately oval-shaped.

12. Method of claim 1 wherein said gratings have approximately the shape of the intersection of a plane intersecting at an angle with a cone.

13. A lens comprising a set of gratings, the spacing of said gratings being determined using aspheric coefficients so that said gratings focus light that passes through said gratings, said aspheric coefficients being selected to cause the spacing of said gratings to vary over the surface of the lens to accommodate a tilt of said lens with respect to incident light so as to produce less coma aberration when the lens is tilted with respect to said incident light than the lens would produce if the incident light were normal to the plane of the lens.

14. Lens of claim 13 wherein said lens both collimates light and focuses light.

15. Lens of claim 13 wherein the tilting of said lens does not introduce substantial coma aberration.

16. Lens of claim 13 wherein the spacing of said gratings changes continuously.

17. Lens of claim 13 wherein said gratings are formed on one side of a body of transparent material.

18. Lens of claim 13 wherein said lens focuses said light onto a target, said gratings causing said light to converge, the variation of the spacing of said gratings reducing or eliminating coma aberration.

19. Lens of claim 13 wherein said gratings are approximately oval-shaped.

20. Lens of claim 13 wherein said gratings have approximately the shape of the intersection of a plane intersecting at an angle with a cone.

21. A lens comprising a set of gratings, the spacing of said gratings being deterred using aspheric coefficients so that said gratings focus light that passes through said gratings, said aspheric coefficients being selected to cause the spacing of said gratings to vary over the surface of the lens to accommodate a tilt of said lens with respect to said light, wherein the aspheric coefficients vary as a function of position on the surface of said lens so that the focal length associated with said gratings varies across the surface of said lens so that different portions of said lens exhibit different focal lengths, said lens being tilted such that a first portion of said lens is closer to a focal point than a second portion of the lens, the focal length exhibited by said first portion being less than the focal length exhibited by said second portion.

22. A method comprising passing a beam of light through a lens, said lens being tilted with respect to the direction of travel of said beam of light, said lens comprising a set of gratings, said light passing through said gratings, the spacing of said gratings being determined using aspheric coefficients so that said gratings focus light, variation in said aspheric coefficients as a function of position on the surface of said lens causing the spacing of said gratings to vary over the surface of the lens so that the tilting of said lens does not introduce substantial coma aberration.

23. Method of claim 22 wherein said lens introduces substantially no spherical aberration into said light.

24. Method of claim 22 wherein said lens focuses light onto a target and said variation in said aspheric coefficients causes the focal length associated with said gratings to vary across the surface of said lens so that different portions of said lens exhibit different focal lengths, such that if said lens is tilted about an axis, the focal length of the gratings that are closer to said target is less than the focal length of the gratings at those portions of the lens that are further from said target.

25. Method of claim 22 wherein said lens focuses said light onto a target, said gratings causing said light to converge, the variation of spacing of said gratings reducing or eliminating coma aberration.

26. Method of claim 22 wherein said gratings both focus light onto a target and collimate light.

27. Method of claim 22 wherein said gratings are approximately oval-shaped.

28. Method of claim 22 wherein said gratings have approximately the shape of the intersection of a plane intersecting at an angle with a cone.

29. A method comprising:
establishing a plurality of sets of aspheric coefficients, each set describing a phase profile; and
using said sets of aspheric coefficients to establish the spacing for a set of diffractive gratings that serve as a lens for collimating light from a light source, said aspheric coefficients being selected to vary the spacing of said diffractive gratings to accommodate a tilt of said lens with respect to said light.

30. A lens comprising a set of gratings, the spacing of said gratings being determined using aspheric coefficients so that said gratings collimate light from a light source, said aspheric coefficients being selected to cause the spacing of said gratings to vary over the surface of the lens to accommodate a tilt of said lens with respect to incident light so as to produce less coma aberration when the lens is tilted with respect to incident light than the lens would produce if the incident light were normal to the plane of the lens.

31. A method comprising passing a beam of light through a lens, said lens being tilted with respect to the direction of travel of said beam of light, said lens comprising a set of gratings, the spacing of said gratings being determined using aspheric coefficients so that said gratings collimate said light, said aspheric coefficients being selected to cause the spacing of said gratings to vary over the surface of said lens so that the tilting of said lens does not introduce substantial coma aberration.

32. A method comprising the acts of:
establishing aspheric coefficients; and
using said aspheric coefficients to establish the spacing for a set of diffractive gratings that serve as a lens for focusing incident light from a light source, said aspheric coefficients being selected to vary the spacing of said diffractive gratings to accommodate a tilt of said lens with respect to said incident light so as to produce less coma aberration when the lens is tilted with respect to incident light than the lens would produce if the incident light were normal to the plane of the lens.

33. A method comprising the acts of:
establishing aspheric coefficients; and
using said aspheric coefficients to establish the spacing for a set of diffractive gratings that serve as a lens for collimating light from a light source, said aspheric coefficients being selected to vary the spacing of said diffractive gratings to accommodate a tilt of said lens with respect to said light so as to produce less coma aberration when the lens is tilted with respect to incident light than the lens would produce if the incident light were normal to the plane of the lens.

34. A method comprising the acts of:
establishing a plurality of functions, each function generating an associated aspheric coefficient, said functions being dependent upon the position on a-major surface of a lens such that said aspheric coefficients vary as a function of position on said major surface; and
using said functions to construct said lens for focusing light and/or collimating light from a light source, said lens having a set of diffractive gratings such that the spacing of said set of diffractive gratings is varied to accommodate a tilt of said lens with respect to said light.

35. A method for making a lens comprising:
establishing aspheric coefficients, said aspheric coefficients varying as a function of position on a lens surface; and
using said aspheric coefficients to form a diffractive lens such that the lens produces less coma aberration when the lens is tilted with respect to incident light than the lens would produce if the incident light were normal to the plane of the lens.

36. Method of claim 35 wherein variation in said aspheric coefficients causes the focal lengths of different portions of said lens to vary as a function of the position on the surface of said lens.

37. Method of claims 1, 22, 27, 31, 32, 33, 34 or 15 wherein said aspheric coefficients vary continuously as a function of position on the surface of said lens.

38. Method of claims 1, 22, 24, 31, 32, 33, 34, or 35 wherein said aspheric coefficients vary discontinuously as a function of position on the surface of said lens.

39. A lens comprising diffractive gratings, said diffractive gratings being established with a set of aspheric coefficients, said aspheric coefficients varying as a function of position on the lens surface.

40. Lens of claim 39 wherein said variation in said aspheric coefficients causes the focal length of different portions of said lens to vary as a function of the position on the surface of said lens.

41. A method comprising passing light through the lens of claim 39.

42. Lens of claims 13, 30 or 39 wherein said aspheric coefficients vary continuously.

43. Lens of claims 13, 30 or 39 wherein said aspheric coefficients vary discontinuously.

* * * * *